(12) United States Patent
Noguchi

(10) Patent No.: US 9,425,898 B2
(45) Date of Patent: Aug. 23, 2016

(54) OPTICAL TRANSMISSION SYSTEM, OPTICAL PHASE MODULATOR, AND OPTICAL MODULATION METHOD

(71) Applicant: NEC Corporation, Minato-ku, Tokyo (JP)

(72) Inventor: Hidemi Noguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/433,713

(22) PCT Filed: Jul. 31, 2013

(86) PCT No.: PCT/JP2013/004639
§ 371 (c)(1),
(2) Date: Apr. 6, 2015

(87) PCT Pub. No.: WO2014/057598
PCT Pub. Date: Apr. 17, 2014

(65) Prior Publication Data
US 2015/0280831 A1     Oct. 1, 2015

(30) Foreign Application Priority Data

Oct. 9, 2012  (JP) ................................. 2012-224214

(51) Int. Cl.
*H04B 10/04* (2006.01)
*H04B 10/548* (2013.01)
(Continued)

(52) U.S. Cl.
CPC ............ *H04B 10/548* (2013.01); *G02F 1/0121* (2013.01); *H04B 10/5051* (2013.01); *H04B 10/516* (2013.01); *H04B 10/5561* (2013.01)

(58) Field of Classification Search
CPC ............... H04B 10/516; H04B 10/548; H04B 10/5561; H04B 10/556; H04B 10/5161

USPC ......... 398/183, 188, 192, 193, 194, 195, 196, 398/197, 198
See application file for complete search history.

(56) References Cited

U.S. PATENT DOCUMENTS

| 8,582,980 | B2 * | 11/2013 | Nishihara | .......... | H04B 10/5162 398/183 |
| 8,611,760 | B2 * | 12/2013 | Nishihara | .......... | H04B 10/5051 398/188 |
| 2010/0014862 | A1 | 1/2010 | Suzuki | | |

FOREIGN PATENT DOCUMENTS

| EP | 0895368 A1 | 2/1999 |
| EP | 1793513 A2 | 6/2007 |

(Continued)

OTHER PUBLICATIONS

International Search Report for PCT Application No. PCT/JP2013/004639, mailed on Oct. 15, 2013.

(Continued)

*Primary Examiner* — Hanh Phan

(57) ABSTRACT

The optical transmission system includes signal output means (11S) for outputting a drive signal according to an input signal to the first optical modulator (11a), first waveform shaping signal output means (12S) for outputting a first waveform shaping signal to the second optical modulator (10A), and second waveform shaping signal output means (13S) for outputting a second waveform shaping signal to the third optical modulator (13a). The first waveform shaping signal is output to the second optical modulator (10A) at a timing relatively later than a timing of an output of a signal by the first optical modulator (11a). The second waveform shaping signal is output to the third optical modulator (13a) at a timing relatively earlier than the timing of the output of the signal by the first optical modulator (11a).

10 Claims, 15 Drawing Sheets

(51) Int. Cl.
*H04B 10/50* (2013.01)
*H04B 10/556* (2013.01)
*H04B 10/516* (2013.01)
*G02F 1/01* (2006.01)

(56) References Cited

FOREIGN PATENT DOCUMENTS

| | | | |
|---|---|---|---|
| JP | H05257102 A | 10/1993 | |
| JP | H05289033 A | 11/1993 | |
| JP | H0713112 A | 1/1995 | |
| JP | 2010-516104 A | 5/2010 | |
| WO | 98/32247 A1 | 7/1998 | |
| WO | 2008/023480 A1 | 2/2008 | |
| WO | 2012/063413 A1 | 5/2012 | |

OTHER PUBLICATIONS

Extended European Search Report for EP Application No. EP13845157.0 dated Apr. 29, 2016.

\* cited by examiner

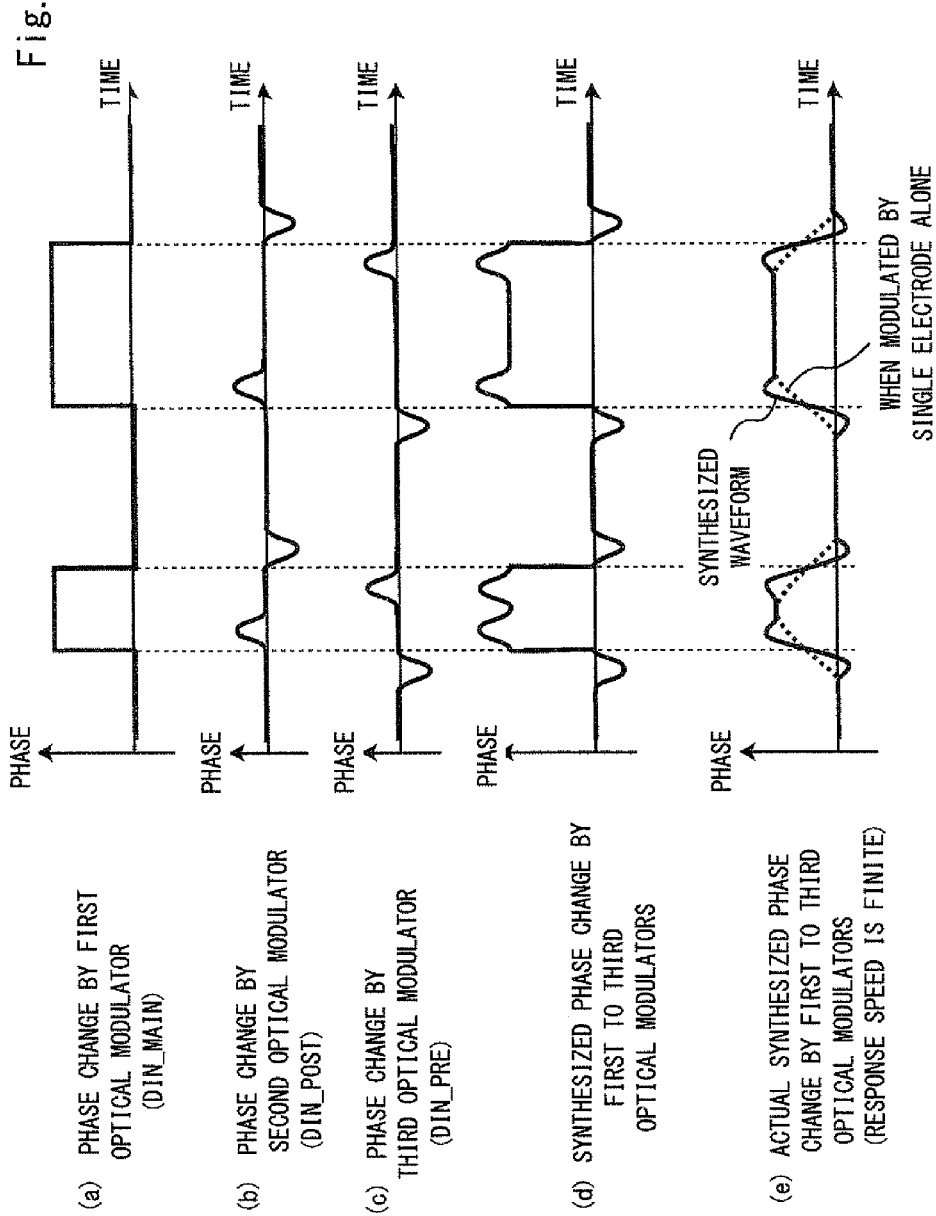

OPTICAL TRANSMISSION SYSTEM, OPTICAL PHASE MODULATOR, AND OPTICAL MODULATION METHOD

This application is a National Stage Entry of PCT/JP2013/004639 filed on Jul. 31, 2013, which claims priority from Japanese Patent Application 2012-224214 filed on Oct. 9, 2012, the contents of all of which are incorporated herein by reference, in their entirety.

TECHNICAL FIELD

The present invention relates to an optical fiber communication technique, and in particular to an optical transmission system, an optical phase modulator, and an optical modulation method.

BACKGROUND ART

As the demand for broadband multimedia communication services such as the Internet and video distributions has explosively increased, high-density wavelength multiplexing optical fiber communication systems having longer distances, larger capacities, and higher reliability have been increasingly introduced in trunk systems and metro-systems (intercity systems). Further, optical fiber access services are also becoming rapidly widespread in subscriber systems. For such communication systems using optical fibers, it is important to reduce the cost required for laying (i.e., constructing) optical fibers serving as optical transmission paths and increase the transmission band use efficiency per optical fiber.

Therefore, a wavelength multiplexing technique in which a plurality of optical signals having different wavelengths are multiplexed and transmitted in the multiplexed state has been widely used. Further, since the increasing traffic cannot be handled by using the wavelength multiplexing technique alone in recent years, the demand for increasing the transmission capacity per wavelength channel has grown even further. For increasing the transmission capacity per wavelength channel, it is advantageous to employ a multi-value optical modulation signal technique whose optical modulation spectrum bandwidth is narrower than that of an ordinary binary optical intensity modulation technique in view of the spectrum use efficiency and the tolerance to the wavelength dispersion and the polarized-wave dispersion of the optical fibers.

For example, optical communication systems using a digital coherent technique, which has started to be commercially used in recent years, uses QPSK (Quadrature Phase Shift Keying) signals. Further, to increase the capacity even further, optical communication systems and the like using larger multi-values such as 16-QAM (Quadrature Amplitude Modulation) have been studied. Further, to increase the capacity per wavelength channel, it is necessary to improve the symbol frequency of data. The bands of components are an important factor for improving the symbol frequency of data.

In the case of optical components commonly used in optical fiber communication systems, for example, since each of such components itself has a capacitance in an actual optical modulator, its response speed is finite and hence does not have an ideal response characteristic. Therefore, since the transient response waveform of a phase modulation is determined based on the band of the drive device that drives the optical modulator, i.e., the transient response speed (rising and falling times) of an electric signal and the band characteristic of the optical modulator itself, there has been a limit on the increase in the speed exceeding 10 Gb/s.

To solve such problems, a related art technique is proposed in Patent Literature 1. FIGS. 14A and 14B show a concept of a phase modulation section of the related art. FIG. 14A shows its configuration diagram, and FIGS. 14B(a) and 14B(b) show waveforms showing a phase modulation state. In the related art, a first optical modulator 101 and a second optical modulator 102 are provided on an optical waveguide. Further, the phase of light passing through the optical waveguide 103 is modulated by applying voltages to these optical modulators.

In this related art, a desired electric input signal DIN is applied to the first optical modulator 101 and a signal DINB, which is delayed from the electric input signal DIN by a timing T and has a polarity reverse of that of the electric input signal DIN, is applied to the second optical modulator 102. It should be noted that the amplitude of the signal DINB is smaller than that of the electric input signal DIN and appropriately chosen. By doing so, as shown in FIG. 14B(a), it is possible to form overshoots and undershoots immediately after the rising/falling edges of the waveform with respect to the original phase modulation waveform. FIG. 14B(a) shows an ideal rectangular waveform having an infinite response speed for the sake of an easier explanation. However, in an actual optical modulator, since the bands of the drive device and the optical modulator are finite, the waveform becomes the one shown in FIG. 14B(b).

As described above, the related art realizes a high-speed optical phase modulation by appropriately setting the delay amount τ and the amplitude of the signal DINB by using the device configuration and thereby performing a waveform shaping process in which the overshoot and undershoot amounts can be appropriately controlled even when the operating speeds of the drive electric device and the optical modulator themselves are not very high.

However, although the above-described optical phase modulator can control overshoots/undershoots immediately after the rising and falling edges of the phase modulation waveform, it cannot control the waveform immediately before the rising and falling edges of the waveform. That is, there is a problem that when the phase modulation waveform is observed as an eye pattern, the waveform at the last part of the eye pattern cannot be shaped, though the waveform at the starting part of the eye pattern can be shaped.

Further, a pulse waveform that is shaped by a device using the above-described technique becomes a left-right asymmetric waveform. This prevents the frequency characteristics of the drive device and the optical modulator, which are affected by various factors, from being perfectly corrected, thus making it impossible to obtain a desired waveform. Further, the related art generates overshoots/undershoots by subtracting the polarity-reversed signal DINB from the original waveform. This is a de-emphasis technique, causing a problem that the amplitude is lowered.

Therefore, to obtain a desired phase change amount (a desired amplitude of the waveform), it is necessary to increase the amplitude of the DIN signal in advance by an amount corresponding to the phase change amount caused by the signal DINB. This leads to a significant increase in the electric power consumed by the drive device. Further, the related art has a problem that it cannot cope with the waveform shaping of multi-value modulations, which are expected to become main-stream in the future.

CITATION LIST

Patent Literature

Patent Literature 1: International Patent Publication No. WO2008/023480

Patent Literature 2: Japanese Unexamined Patent Application Publication No. H7-13112

Patent Literature 3: Japanese Unexamined Patent Application Publication No. H5-289033

Patent Literature 4: Japanese Unexamined Patent Application Publication No. H5-257102

SUMMARY OF INVENTION

Technical Problem

As described above, the method in which an optical signal is synthesized by delaying an optical signal and reversing its polarity cannot control the waveform immediately before the rising and falling edges of the waveform. Further, the waveform of the synthesized signal becomes asymmetric. Further, since the amplitude of the optical signal is lowered, it is necessary to increase the voltage in advance by an amount corresponding to the decrease in the amplitude, thus causing an increase in the power consumption.

The present invention has been made in view of the above-described problems and an object thereof is to provide an optical transmission system, an optical phase modulator, and an optical modulation method capable of shaping a pulse waveform with an excellent symmetry and thereby achieving a high-speed waveform response even when the operating speeds of the drive device and the optical modulator themselves are not very high.

Solution to Problem

An optical transmission system according to an aspect includes: a first optical modulator that performs an optical modulation process for input light; a second optical modulator that performs an optical modulation process for the input light; a third optical modulator that performs an optical modulation process for the input light; signal output means for outputting a drive signal according to an input signal to the first optical modulator; first waveform shaping signal output means for outputting a first waveform shaping signal to the second optical modulator; and second waveform shaping signal output means for outputting a second waveform shaping signal to the third optical modulator, in which the first waveform shaping signal output means outputs the first waveform shaping signal at a timing relatively later than a timing of an output of a signal by the first optical modulator, and the second waveform shaping signal output means outputs the second waveform shaping signal at a timing relatively earlier than the timing of the output of the signal by the first optical modulator.

An optical phase modulator according to an aspect includes: a first optical modulator that performs an optical modulation process for input light; a second optical modulator that performs an optical modulation process for the input light; a third optical modulator that performs an optical modulation process for the input light; signal output means for outputting a drive signal according to an input signal to the first optical modulator; first waveform shaping signal output means for outputting a first waveform shaping signal to the second optical modulator; and second waveform shaping signal output means for outputting a second waveform shaping signal to the third optical modulator, in which the first waveform shaping signal output means outputs the first waveform shaping signal at a timing relatively later than a timing of an output of a signal by the first optical modulator, and the second waveform shaping signal output means outputs the second waveform shaping signal at a timing relatively earlier than the timing of the output of the signal by the first optical modulator.

An optical modulation method according to an aspect is an optical modulation method for modulating input light based on a drive signal, a first waveform shaping signal, and a second waveform shaping signal, the drive signal being adapted to change according to an input signal, the optical modulation method including: performing an optical modulation for the input light by using the drive signal; performing waveform shaping for the input light by using the second waveform shaping signal at a timing relatively earlier than a timing of the drive signal; and performing waveform shaping for the input light by using the first waveform shaping signal at a timing relatively later than the timing of the drive signal.

Advantageous Effects of Invention

According to the present invention, it is possible to provide an optical transmission system, an optical phase modulator, and an optical modulation method capable of shaping a pulse waveform with an excellent symmetry and thereby achieving a high-speed waveform response even when the operating speeds of the drive device and the optical modulator themselves are not very high.

BRIEF DESCRIPTION OF DRAWINGS

FIG. 6 is a diagram for explaining an operation of the optical modulator according to the second exemplary embodiment;

DESCRIPTION OF EMBODIMENTS

First Exemplary Embodiment of the Invention

Figure 1:
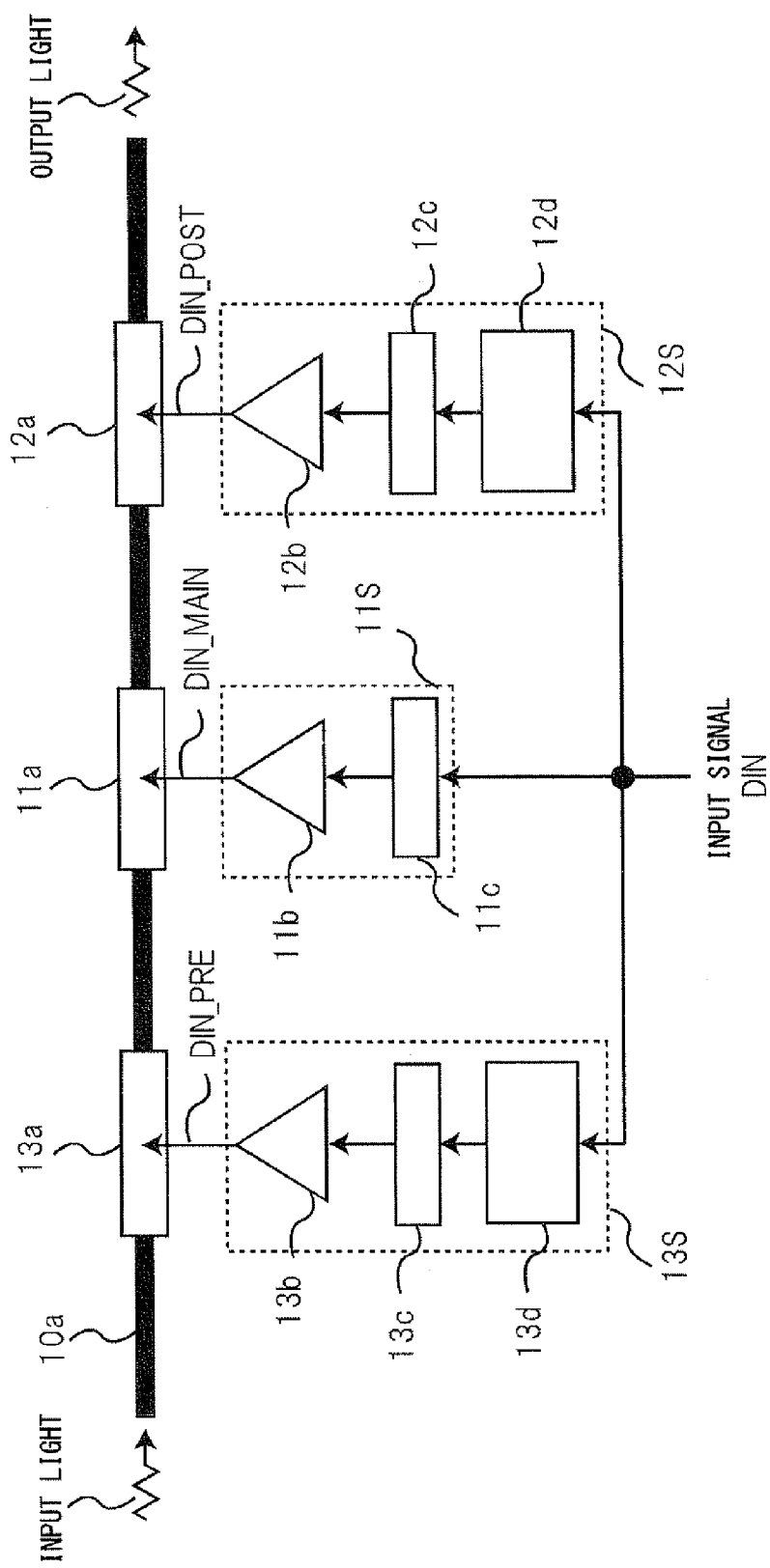
FIG. 1 is a general configuration diagram of an optical modulator according to a first exemplary embodiment.

Exemplary embodiments according to the present invention are explained hereinafter with reference to the drawings. FIG. 1 is a general configuration diagram of an optical phase modulator 10 according to an exemplary embodiment of the present invention. As shown in the figure, the optical phase modulator 10 includes an optical waveguide 10a that guides an input optical signal, signal output means 11S, second waveform shaping signal output means 12S, third waveform shaping signal output means 13S, and first to third optical modulators (11a, 12a and 13a).

The signal output means 11S includes a first electric delay device 11c that delays an input signal DIN, and a first drive device 11b that receives an output of the first electric delay device 11c and outputs an electric signal DIN_MAIN for driving the optical modulator.

The second waveform shaping signal output means 12S includes a second drive device 12b, a second electric delay device 12c, and a first waveform shaping signal generation device 12d.

The second drive device 12b receives an output of the second electric delay device 12c and outputs an electric signal DIN_POST for driving the second optical modulator 12a.

The second electric delay device 12c delays an output of the first waveform shaping signal generation device 12d.

The first waveform shaping signal generation device 12d generates a waveform shaping signal based on the input signal DIN.

The third waveform shaping signal output means 13S includes a third drive device 13b, a third electric delay device 13c, and a second waveform shaping signal generation device 13d.

The third drive device 13b receives an output of the third electric delay device 13c and outputs an electric signal DIN_PRE for driving the optical modulator 13a.

The third electric delay device 13c delays an output of the second waveform shaping signal generation device 13d.

The second waveform shaping signal generation device 13d generates a waveform shaping signal based on the input signal DIN.

The first optical modulator 11a receives the electric signal DIN_MAIN, which is an output of the signal output means 11S, modulates the phase of light passing through the optical waveguide 10a, and outputs the phase-modulated light.

The second optical modulator 12a receives the electric signal DIN_POST, which is an output of the first waveform shaping signal output means 12S, modulates the phase of the light passing through the optical waveguide 10a, and outputs the phase-modulated light.

The third optical modulator 13a receives the electric signal DIN_PRE, which is an output of the second waveform shaping signal output means 13S, modulates the phase of the light passing through the optical waveguide 10a, and outputs the phase-modulated light.

The difference between the related art and this exemplary embodiment of the present invention lies in that the optical phase modulator 10 includes the third optical modulator 13a in addition to the first and second optical modulators (101 and 102). Further, another difference is that the delay amounts by the first to third electric delay devices (11c, 12c and 13c) are set so that the order of the output timings of the three electric signals for driving the first to third optical modulators becomes the order of DIN_PRE, DIN_MAIN and DIN_POST. That is, in contrast to the related art, the optical phase modulator 10 includes, in addition to the second optical modulator 12a that is driven at a timing that is later than the drive timing of the first optical modulator 11a, which is the main optical modulator, the third optical modulator 13a that is driven at a timing that is earlier than the drive timing of the first optical modulator 11a by a predetermined time.

Figure 2:
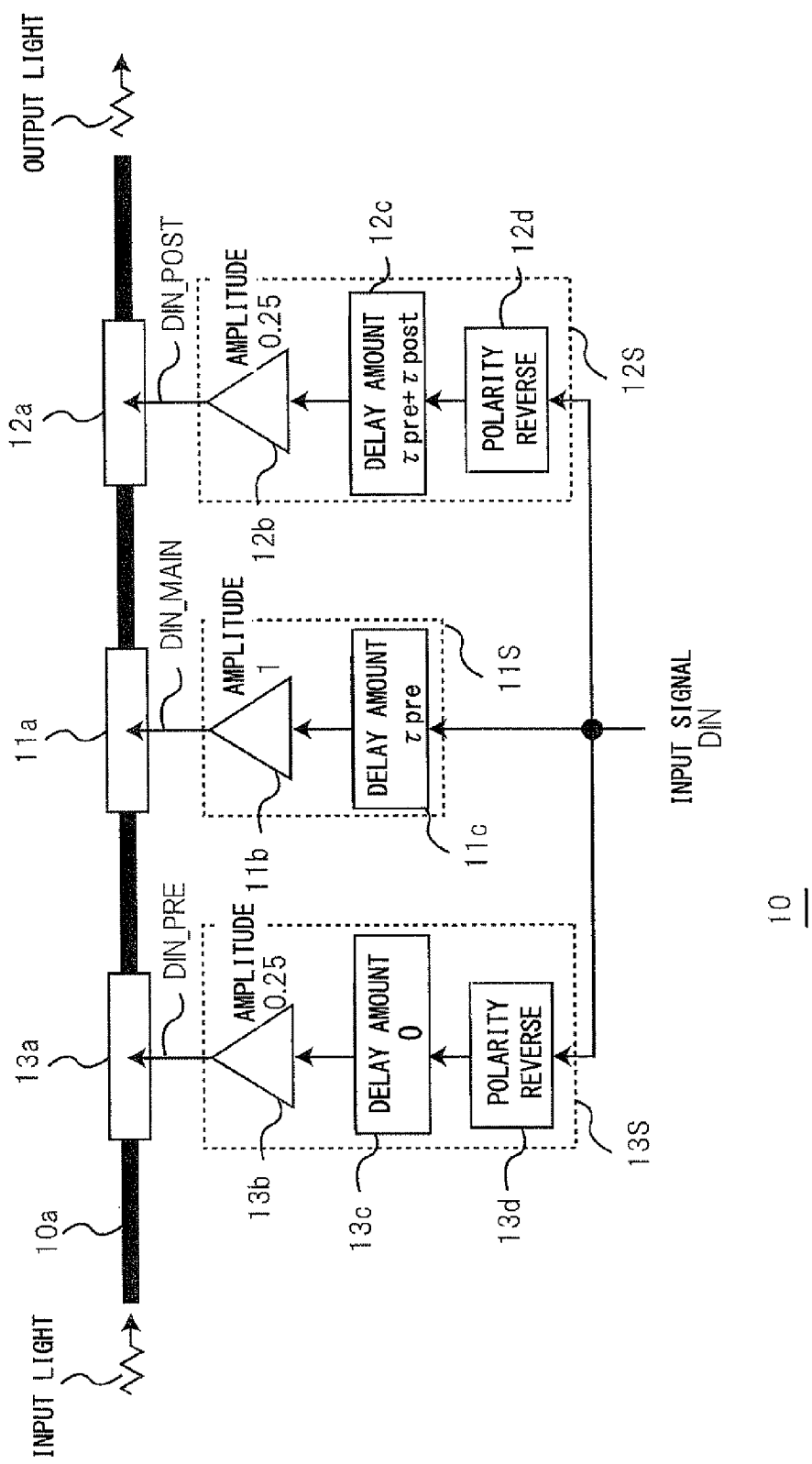
FIG. 2 is a specific configuration diagram of an optical modulator according to the first exemplary embodiment.
Figure 3:
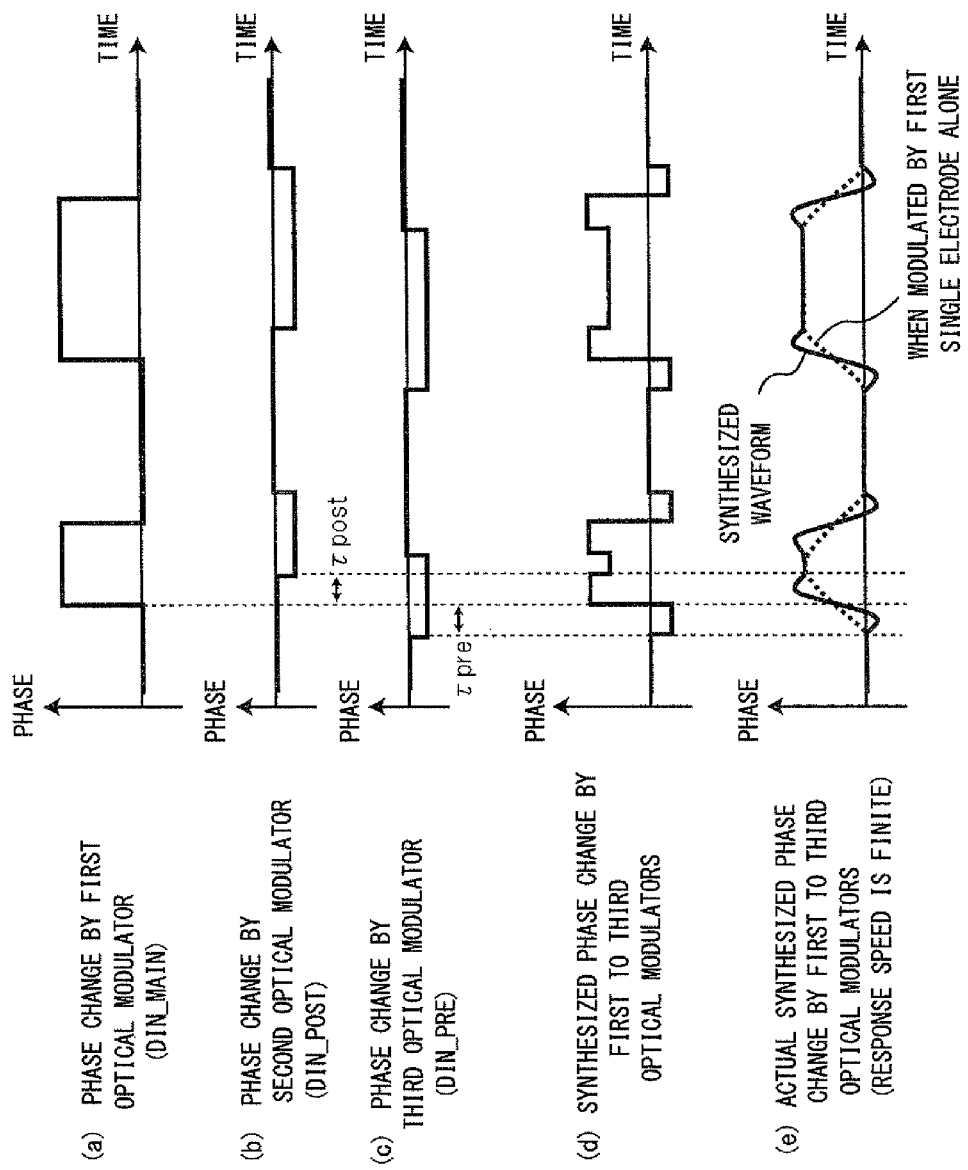
FIG. 3 is a diagram for explaining an operation of the optical modulator according to the first exemplary embodiment.

FIG. 2 shows a configuration diagram of the first exemplary embodiment in a more detailed manner. Further, FIG. 3 shows a diagram for explaining an operation of the first exemplary embodiment. Firstly, an electric signal DIN, which is an input signal, is divided into three branches for the first electric delay device 11c, and the first and second waveform shaping signal generation devices. In the first electric delay device 11c, the input signal DIN is delayed by a predetermined time and the delayed signal is transmitted to the first drive device 11b. The first drive device 11b amplifies that signal to a predetermined amplitude and drives the first optical modulator 11a by the amplified signal. Here, the electric signal for driving the first optical modulator 11a is expressed as "DIN_MAIN", and FIG. 3(a) shows phase modulation amounts of light given by that signal.

Next, the first waveform shaping signal generation device 12d reverses the polarity of the input signal DIN and transmits the phase-reversed signal to the second electric delay device 12c. The second electric delay device 12c delays that signal by a predetermined time and transmits the delayed signal to the second drive device 12b. The second drive device 12b amplifies that signal to a predetermined amplitude and drives the second optical modulator 12a by the amplified signal. Here, the electric signal for driving the second optical modulator 12a is expressed as "DIN_POST", and FIG. 3(b) shows phase modulation amounts of light given by that signal. Further, similarly to the first waveform shaping signal generation device, the second waveform shaping signal generation device 13d reverses the polarity of the input signal DIN and transmits the phase-reversed signal to the third electric delay device 13c.

The third electric delay device 13c delays the above signal by a predetermined time and transmits the delayed signal to the third drive device 13b. The third drive device 13b amplifies that signal to a predetermined amplitude and drives the third optical modulator 13a by the amplified signal. Here, the electric signal for driving the third optical modulator 13a is expressed as "DIN_PRE", and FIG. 3(c) shows phase modulation amounts of light given by that signal. Note that the delay amounts by the first, second and third electric delay devices (11c, 12c and 13c) are set to τpre, (τpre+τpost), 0, respectively. By doing so, as shown in FIGS. 3(a), 3(b) and 3(c), the first to third optical modulators (11a, 12a and 13a) are driven in the order of DIN_PRE, DIN_MAIN and DIN_POST.

As a result, the phase modulation amount of the light that has passed through the first to third optical modulators (11a, 12a and 13a) is expressed by a waveform that is obtained by summing up all of the phase change waveforms shown in FIGS. 3(a), 3(b) and 3(c). Consequently, a waveform shown in FIG. 3(d) is eventually obtained. In contrast to the phase changes according to the related art, the waveform shown in FIG. 3(d) achieves undershoots and overshoots immediately before the rising/falling edges in addition to the overshoots and undershoots immediately after the rising/falling edges. This effect is obtained by adding the third optical modulator that is driven at a timing earlier than the timing of the phase change signal of the first optical modulator 11a, which is the main optical modulator.

Further, FIG. 2 shows a waveform response in a case where the amplitudes of the first to third drive devices 13b are set so that the relative phase modulation amounts of the signals DIN_PRE, DIN_MAIN and DIN_POST become 0.25:1:0.25. The amounts of the overshoots and undershoots in the amplitude direction can be adjusted by changing this amplitude ratio. Further, the amounts of the overshoots and undershoots in the time-axis direction can also be adjusted by adjusting the first to third delay amounts. Therefore, it is possible to appropriately shape a waveform for every possible condition for optical modulators and for drive devices by appropriately setting the amplitudes and the delay amounts according to the bands of the optical modulators and the drive devices.

For easier understanding, each of FIGS. 3(a), 3(b), 3(c) and 3(d) shows an ideal waveform in which the rising and falling response times are infinite (∞). An actual waveform having a finite response time becomes the one shown in FIG. 3(e). That is, it is possible to make the rising/falling responses steeper compared to a simple waveform response that is obtained by driving the first optical modulator 11a alone, which is shown by dotted lines in FIG. 3(e). Further, in contrast to the waveform shaping in the related art, the optical modulator according to this exemplary embodiment can make the rising/falling responses steeper without impairing the symmetry of the waveform, thus making it possible to achieve an ideal waveform shaping effect.

Further, although a case where each of the first to third optical modulators (11a, 12a and 13a) is formed by using a single electrode is explained in the above explanation for the sake of a simple explanation, each of them may be formed by using a plurality of electrodes. For example, for the second and third optical modulators, it is possible to shape the final synthesized phase modulation waveform into a more appropriate waveform by providing a plurality of optical modulators and performing phase modulations by using drive signals having mutually different timings according to the transient response time of the waveform response of the first optical modulator 11a, which is the main optical modulator.

Second Exemplary Embodiment of the Invention

Figure 4:
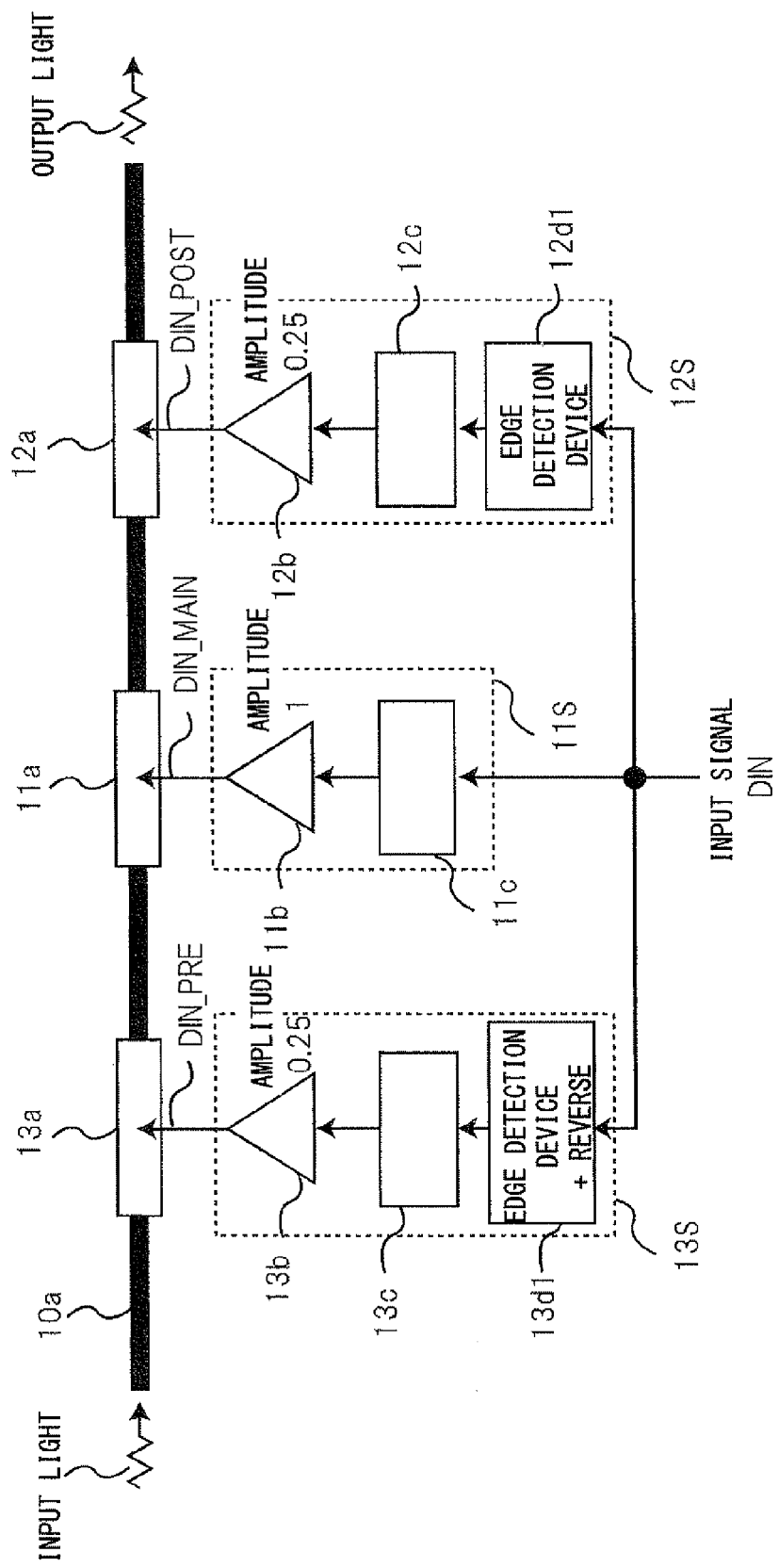
FIG. 4 is a configuration diagram of an optical modulator according to a second exemplary embodiment.
Figure 5A:
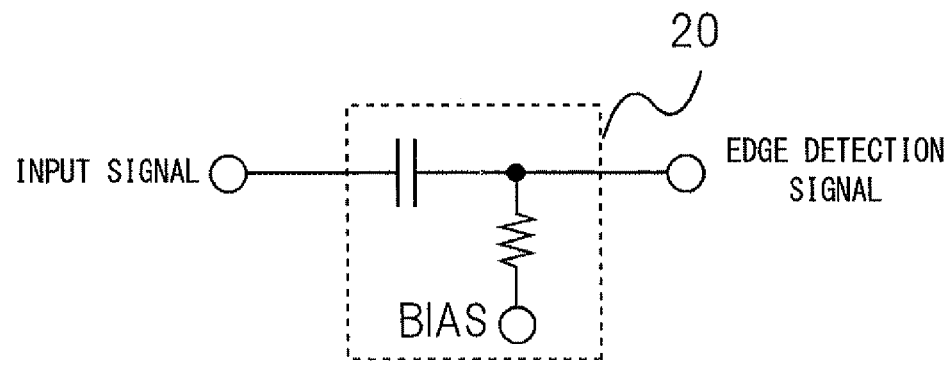
FIG. 5A is a configuration diagram of first and second waveform shaping signal generation devices of the optical modulator according to the second exemplary embodiment.
Figure 5B:
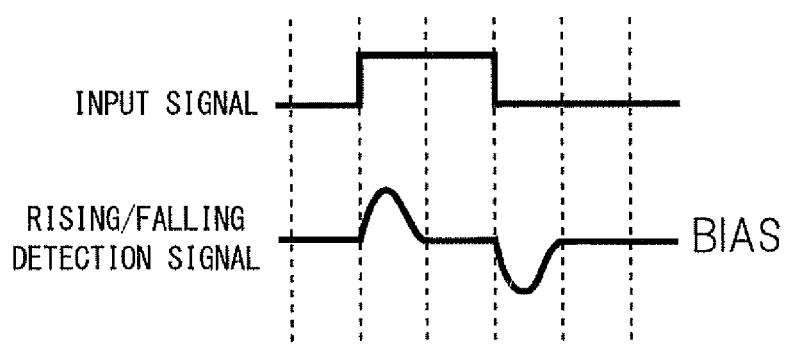
FIG. 5B is a configuration diagram of first and second waveform shaping signal generation devices of the optical modulator according to the second exemplary embodiment.

Next, a second exemplary embodiment according to the present invention is explained with reference to FIG. 4. This exemplary embodiment is characterized in that an edge detection device(s) is applied, instead of using the simple polarity reverse, for the first and second waveform shaping signal generation devices (12d and 13d) in the configuration of the first exemplary embodiment. In this example, an analog differential device 20 shown in FIGS. 5A and 5B is used as each of first and second waveform shaping signal generation devices (12d1 and 13d1). Further, FIG. 6 shows a diagram for explaining an operation of the second exemplary embodiment. Similarly to the first exemplary embodiment, the input signal DIN is divided into three branches for the first electric delay device 11c, and the first and second waveform shaping signal generation devices (12d1 and 13d1).

Firstly, the first waveform shaping signal generation device 12d1 receives an input signal DIN, then detects edges of the DIN waveform, and next generates an edge detection signal corresponding to the rising/falling edges of the DIN waveform according to the operation of the analog differential device 20 shown in FIGS. 5A and 5B. Meanwhile, the second waveform shaping signal generation device 13d1 generates an edge detection signal corresponding to the rising/falling edges of the DIN waveform according to the operation of the analog differential device 20 in a similar manner, and then performs a polarity reverse process. Next, the edge detection signals generated by the first and second waveform shaping signal generation devices (12d1 and 13d1) drive the second and third optical modulators (12a and 13a), respectively, through the second and third electric delay devices 13c and the second and third drive devices (12b and 13b), respectively.

It should be noted that the second electric delay device adjusts the timing by giving an appropriate delay so that the edge detection signal occurs immediately after the rising/falling edges of the phase waveform (FIG. 6(a)) of the first optical modulator 11a, which is the main optical modulator, as shown in FIG. 6(b). Meanwhile, the third electric delay device 13c adjusts the timing by giving an appropriate delay so that the edge detection signal occurs immediately before the rising/falling edges of the phase waveform (FIG. 6(a)) of the first optical modulator 11a, which is the main optical modulator, as shown in FIG. 6(c). As a result, the phase waveforms of the first to third optical modulators are combined, thus making it possible to eventually obtain an optical phase modulation waveform shown in FIG. 6(d).

Each of FIGS. 6(a), 6(b), 6(c) and 6(d) shows an ideal waveform having an infinite response speed. However, an actual waveform having a finite response time becomes the one shown in FIG. 6(e). Similarly to the first exemplary embodiment, this exemplary embodiment can make the rising/falling responses steeper compared to the optical phase modulation waveform obtained by driving the first optical modulator 11a alone without impairing the symmetry of the pulse waveform, thus making it possible to achieve an ideal waveform shaping effect. Further, according to this exemplary embodiment, the amounts of the overshoots and undershoots in the amplitude direction can be adjusted by changing the amplitude of the drive device, thus making it possible to appropriately shape the waveform according to the bands of the optical modulators and the drive devices.

Further, one of the additional advantages of this exemplary embodiment is power efficiency. In the related art or the method according to the first exemplary embodiment, overshoot and undershoot waveforms are obtained by lowering the amplitude of the original waveform of the first optical modulator 11a. Therefore, it is necessary to increase the phase modulation amplitude of the first optical modulator 11a, which is the main optical modulator, in advance in order to obtain a waveform having a desired amplitude, thus consuming extra electric power. In contrast to this, the optical modulator according to this exemplary embodiment obtains overshoots and undershoots by adding edge detection signals generated by the first and second waveform shaping signal generation devices (12d and 13d) to the phase modulation waveform of the first optical modulator 11a, which is the main optical modulator.

Therefore, there is no need to increase the phase modulation amplitude of the first optical modulator 11a in advance. That is, since the electric power consumed to generate the phase modulation waveforms of the second and third optical modulators is entirely consumed as the electric power for the overshoots and undershoots, the power efficiency of this exemplary embodiment is higher than that of the related art.

Figure 7A:
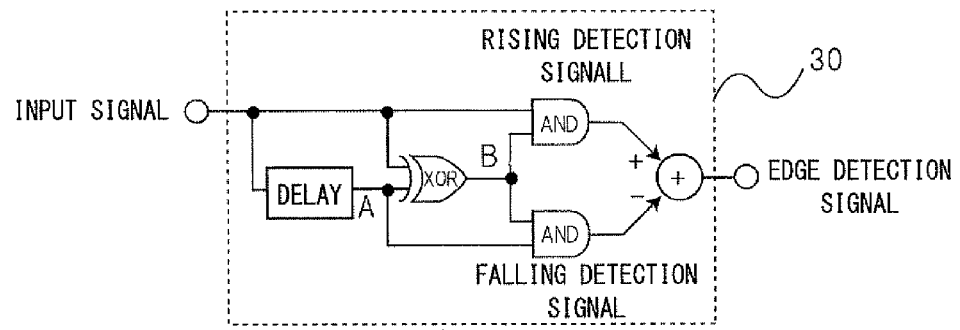
FIG. 7A is a configuration diagram of other first and second waveform shaping signal generation devices of the optical modulator according to the second exemplary embodiment.
Figure 7B:
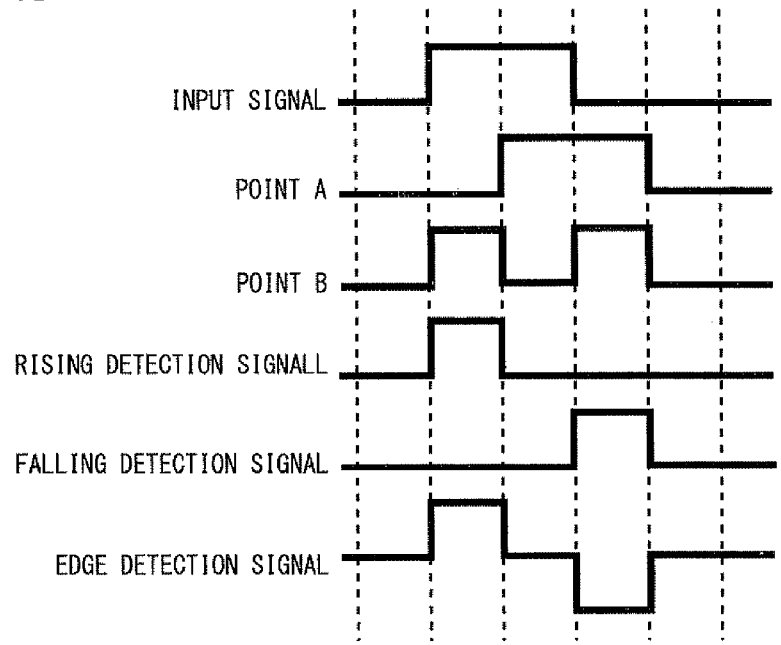
FIG. 7B is a configuration diagram of other first and second waveform shaping signal generation devices of the optical modulator according to the second exemplary embodiment.

Further, as the edge detection device(s) used in the first and second waveform shaping signal generation devices (12d1 and 13d1), an edge detection device(s) using a digital device 30 shown in FIGS. 7A and 7B may be used in place of the analog differential device(s) 20 shown in FIGS. 5A and 5B.

Third Exemplary Embodiment of the Invention

Figure 8:
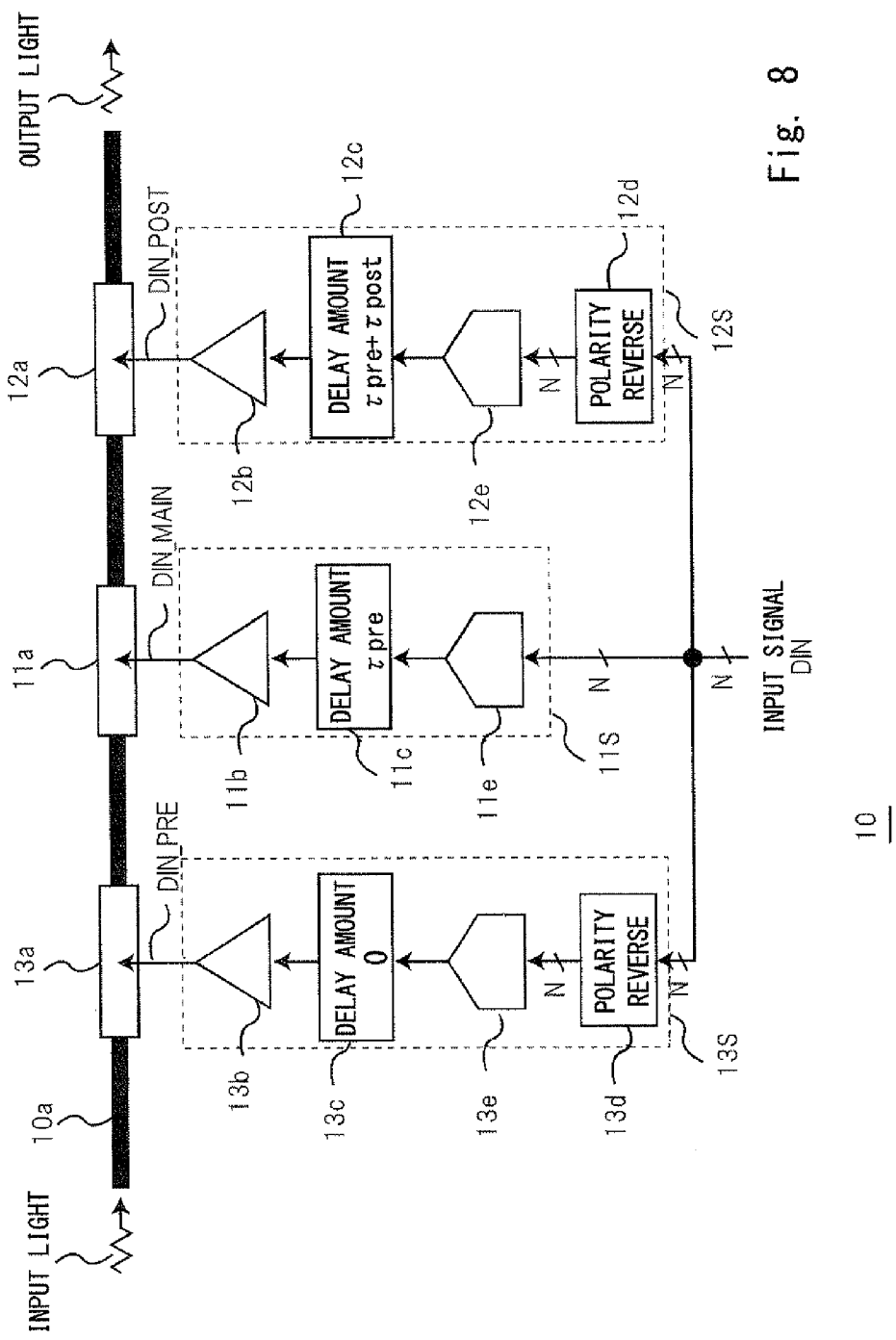
FIG. 8 is a configuration diagram of a multi-value optical modulator according to a third exemplary embodiment.

Next, FIG. 8 shows a configuration of an optical modulator according to a third exemplary embodiment. The third exemplary embodiment drives each of the first to third optical modulators by an amplitude multi-value signal by using a Digital-to-Analog Converter (DAC) in order to cope with a multi-value modulation signal, which is expected to be increasingly used in the future to increase the transmission capacity. The fundamental operating principle of this exemplary embodiment is similar to that of the first exemplary embodiment except that, instead of the electric signals DIN_PRE, DIN_MAIN and DIN_POST for driving the first to third optical modulators being the binary NRZ (Non Return to Zero) signals used in the first exemplary embodiment, they are electric signals having N-value amplitude values generated by first to third DACs (11e, 12e and 13e). The input signal consists of an N-bit digital signal to express a multi-value signal, and is divided into three branches for the first DAC 11e, and the first and second waveform shaping signal generation devices (12d and 13d).

Figure 9:
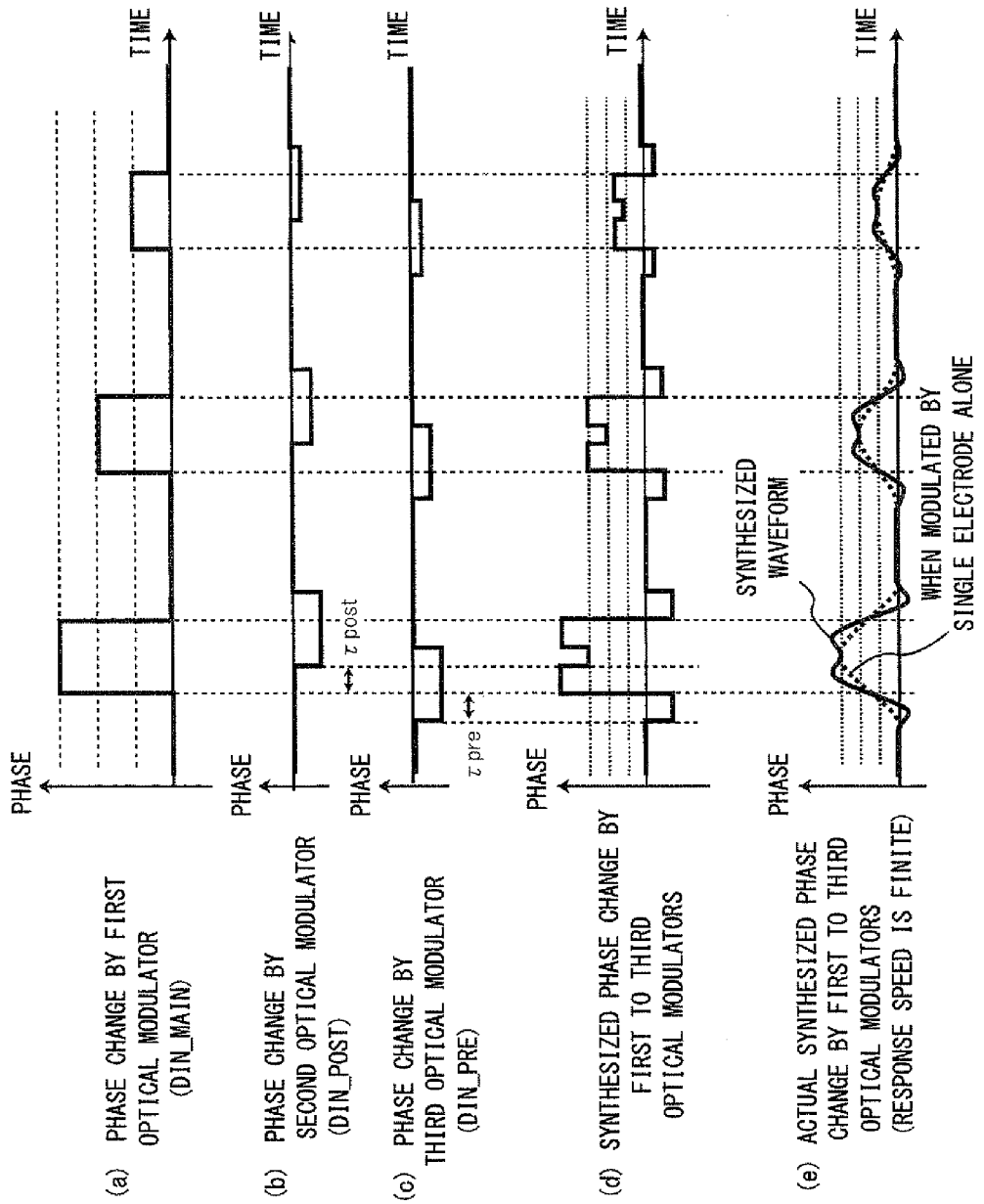
FIG. 9 is a diagram for explaining an operation of the optical modulator according to the third exemplary embodiment.

It is assumed that N is a bit number equal to or greater than the levels of a desired multi-value modulation. The first and second waveform shaping signal generation devices (12d and 13d) receive an N-bit input signal DIN, reverse its polarity, and transmit the polarity-reversed signal to the first and third DACs (11e and 13e), respectively. The signals output from the first to third DACs (11e, 12e and 13e) are transmitted to the first to third drive devices (11b, 12b and 13b) through the first to third delay devices (11c, 12c and 13c), and drive the first to third optical modulators (11a, 12a and 13a), respectively. For explaining a specific operation, FIG. 9 shows a diagram for explaining an operation of the third exemplary embodiment.

In order to give a simpler explanation, a case of a 4-value phase modulation is explained hereinafter. The first optical modulator 11a, which is the main optical modulator, performs, for example, an optical phase modulation having a 4-level amplitude value as shown in FIG. 9(a). Further, in the second and third optical modulators (12a and 13a), optical phase modulation waveforms having an amplitude smaller than that of the first optical modulator 11a and a polarity the reverse of that of the first optical modulator 11a are obtained. In addition, in the second optical modulator 12a, the drive timing of the optical phase modulation waveform is delayed so as to be later than that of the first optical modulator 11a by τpost. Further, in the third optical modulator, the drive timing of the optical phase modulation waveform is advanced so as to be earlier than that of the first optical modulator 11a by τpre.

As a result, the final synthesized waveform becomes the one shown in FIG. 9(d). Similarly to the waveforms according to the first and second exemplary embodiments, the rising/falling edges can be made steeper without impairing the symmetry. Further, overshoots and undershoots can be appropriately set by appropriately choosing the amplitudes of the signal DIN_POST and DIN_PRE for driving the second and third optical modulators. Note that each of FIGS. 9(a), 9(b), 9(c) and 9(d) shows an ideal waveform having an infinite response speed.

An actual waveform having a finite response time becomes the one shown in FIG. 9(e). Similarly to the first and second exemplary embodiments, the waveform can be appropriately shaped even in the case of the multi-value modulation. Further, as a technique for a multi-value modulation, Patent Literature 2 to 4, for example, propose a method using a plurality of divided electrodes. Even in this exemplary embodiment, such a multi-value optical modulator using a plurality of divided electrodes can also be applied to the first and third optical modulators (11a, 12a and 13a).

Figure 10:
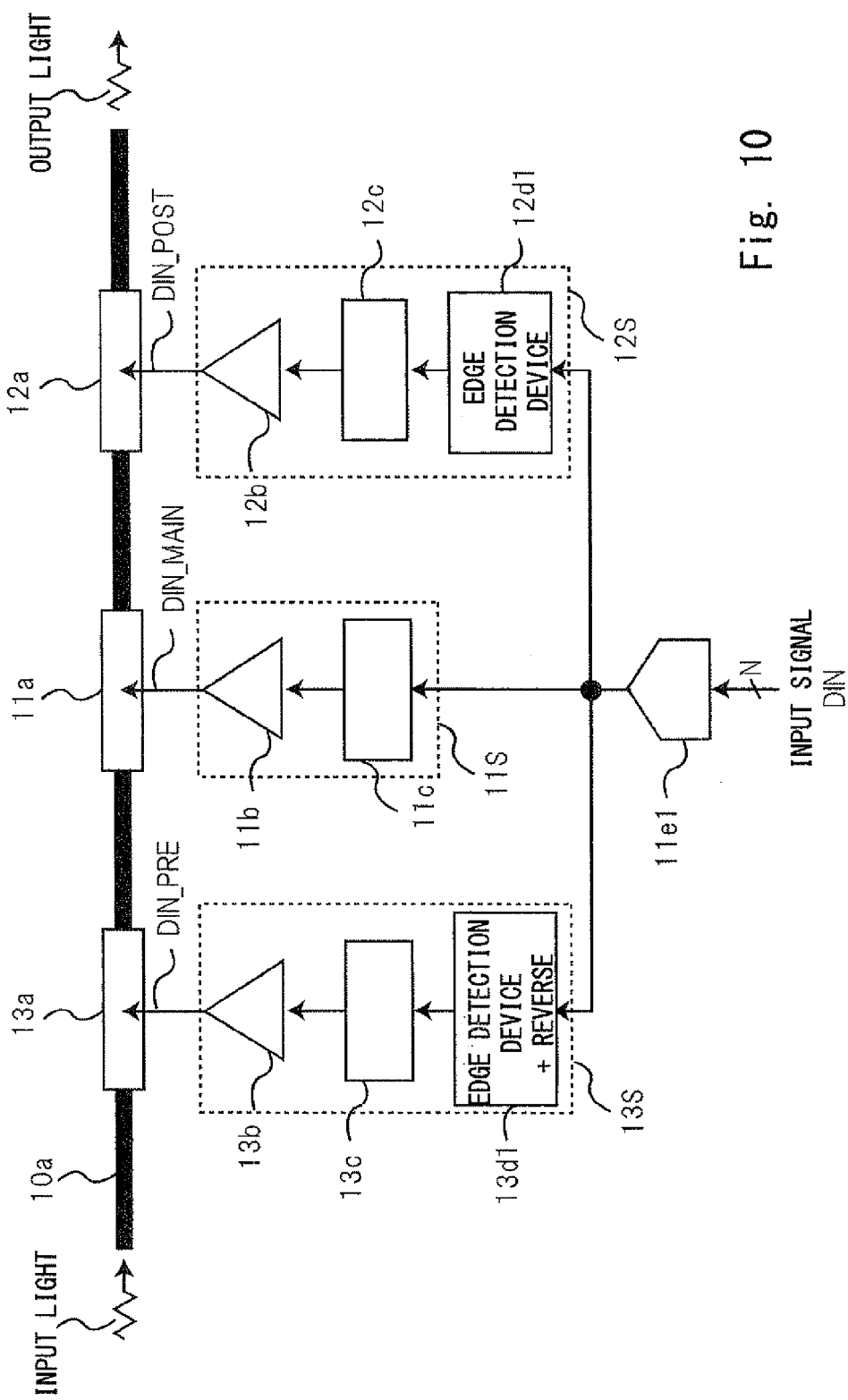
FIG. 10 is a configuration diagram of a multi-value optical modulator according to a fourth exemplary embodiment.
Figure 11:
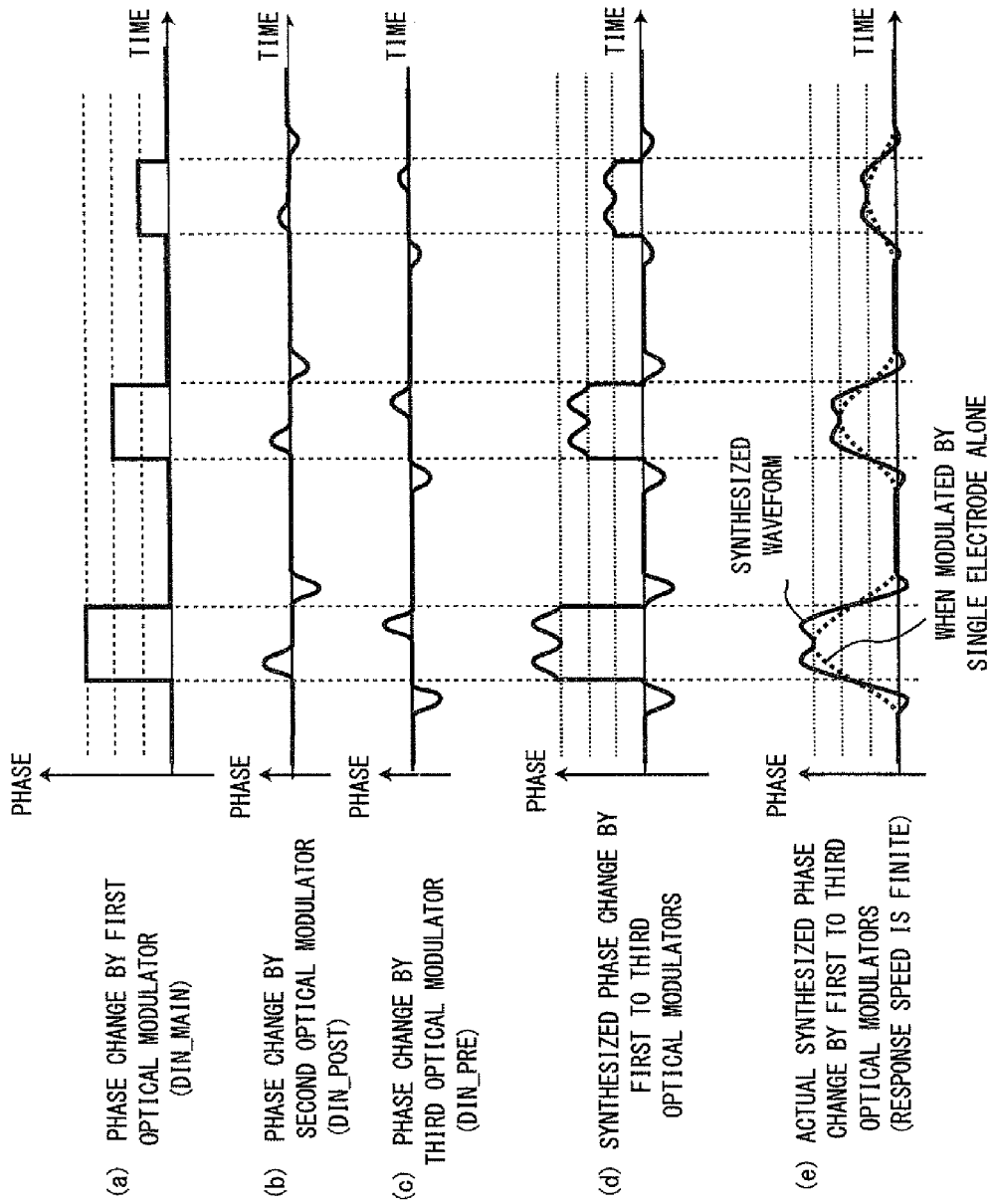
FIG. 11 is a diagram for explaining an operation of the optical modulator according to the fourth exemplary embodiment.

Next, FIG. 10 shows a configuration of an optical modulator according to a fourth exemplary embodiment. Similarly to the second exemplary embodiment, the waveform shaping using the first and second edge detection devices (12d1 and 13d1) can be performed even in the multi-value optical modulator, which is the third exemplary embodiment. The configuration shown in FIG. 10 is roughly similar to that of the second exemplary embodiment shown in FIG. 4. The difference is that the configuration shown in FIG. 10 includes a DAC 11e1 that converts the input signal DIN into a multi-value amplitude electric signal as the first step. The processes performed after this DAC 11e1 are similar to those of the second exemplary embodiment, and therefore detailed explanations thereof are omitted. As an example, FIG. 11 shows a diagram for explaining an operation in the case of a 4-value optical phase modulation. FIG. 11(a) shows a phase modulation waveform of the first optical modulator 11a, which is the main optical modulator, and FIGS. 11(b) and 11(c) show optical phase modulation waveforms for waveform shaping by the second and third optical modulators (12a and 13a).

As a result, the final synthesized waveform becomes one shown in FIG. 11(d). Similarly to the waveforms according to the first and second exemplary embodiments, a waveform having an excellent symmetry and steep rising/falling edges can be obtained. Each of FIGS. 11(a), 11(b), 11(c) and 11(d) shows an ideal waveform having an infinite response speed. An actual waveform having a finite response time becomes one shown in FIG. 11(e). This exemplary embodiment can also achieve similar effects to those of the third exemplary embodiment.

Next, a Mach-Zehnder optical modulator, which is a fifth exemplary embodiment of the present invention, is explained with reference to FIG. 12. This exemplary embodiment is a Mach-Zehnder optical modulator using two optical modulators according to the above-described first to fourth exemplary embodiments. This is a Mach-Zehnder optical modulator including an optical demultiplexer that separates input light, two waveguides (10a and 10b) that guide the separated light beams, groups of optical modulators according to any of the first to fourth exemplary embodiments each of which is formed on a respective one of the aforementioned two waveguides, and an optical demultiplexer that combines the light beams whose phases have been modulated by the aforementioned two optical modulators.

Figure 12:
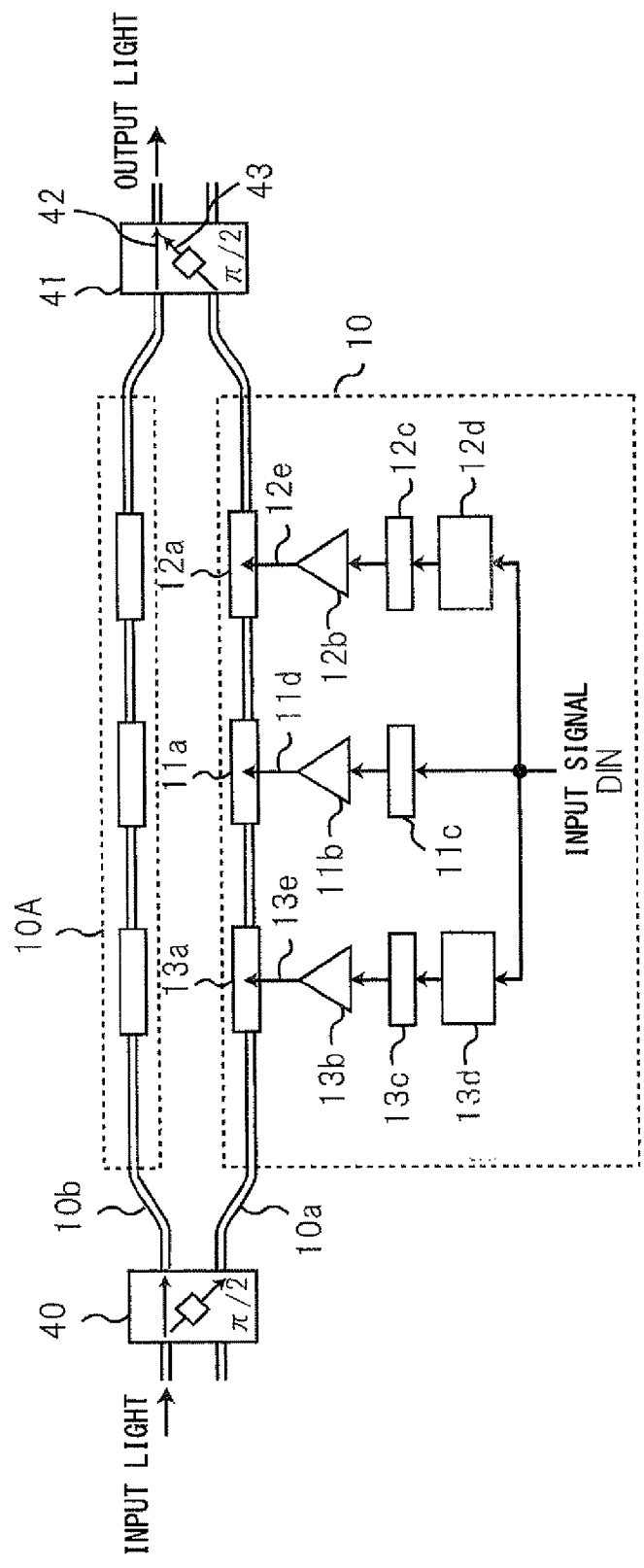
FIG. 12 is a configuration diagram of a Mach-Zehnder optical modulator according to a fifth exemplary embodiment.

For simplifying the figure, FIG. 12 shows only the optical modulator section for the second optical modulator group. In reality, the second optical modulator group has a configuration similar to that of the first optical modulator group 11a. In the above explanation, the optical modulators have been explained as phase modulators. However, by using a configuration of a Mach-Zehnder interferometer as in the case of this exemplary embodiment, they can be used as optical amplitude modulators. Needless to say, even when they are used as optical amplitude modulators, arbitrary waveform shaping can be performed in a similar manner.

However, in the case where such an optical amplitude modulation signal is received, although it is possible to receive it by using a widely and commonly used single reception photodiode, a negative side complex amplitude in which an optical carrier phase is reversed is folded back to a positive side since light is converted into an electric signal in accordance with the principle of square-law detection. Therefore, an offset may be given so that undershoots do not have a negative side amplitude after the waveform shaping.

In contrast to this, when a system configuration in which a signal is received by a balanced receiver consisting of a delay interferometer like one used in DPSK and DQPSK optical communication systems and two photodiodes is adopted, it is possible to express the negative side complex amplitude, thus eliminating the need for the offset explained above. Further, an I/Q optical modulator may be formed by combining two Mach-Zehnder optical modulators according to this exemplary embodiment. Further, an optical modulator capable of coping with 100 G transmission system polarized-wave multiplexing QPSK, which has started to be commercially used in recent years, may be formed by combining two I/Q optical modulators explained above.

Figure 13:
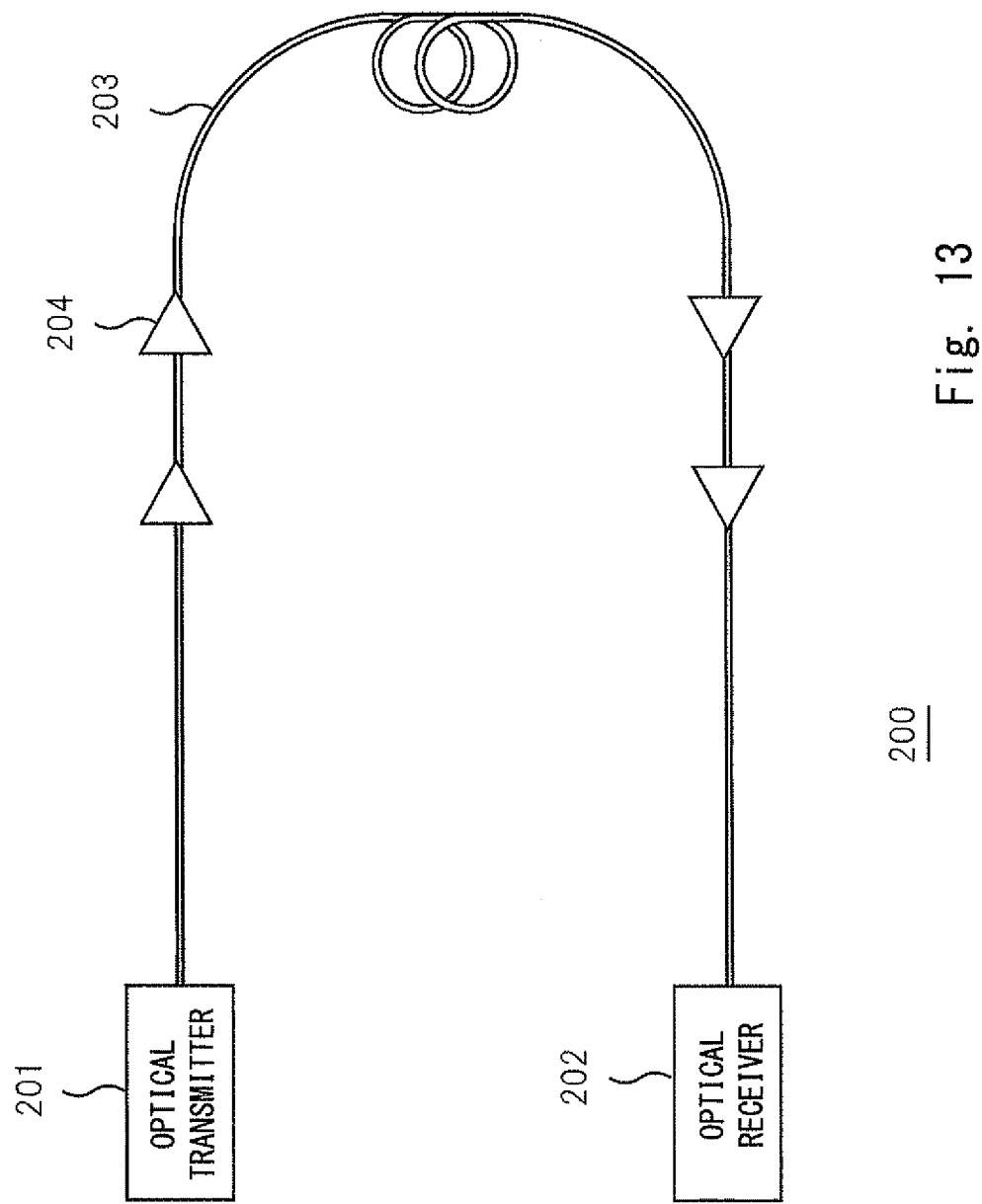
FIG. 13 is a configuration diagram of an optical transmission/reception system according to a sixth exemplary embodiment.
Figure 14A:
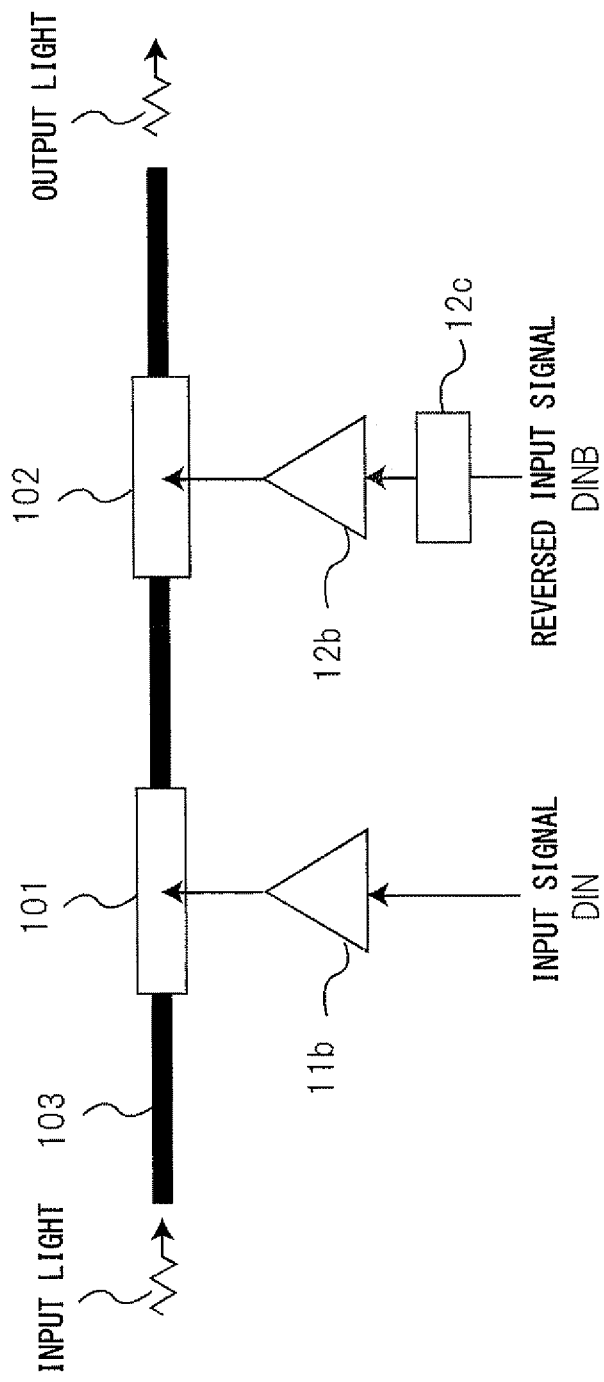
FIG. 14A is a configuration diagram of an optical modulator according to related art and a diagram for explaining its operation.
Figure 14B:
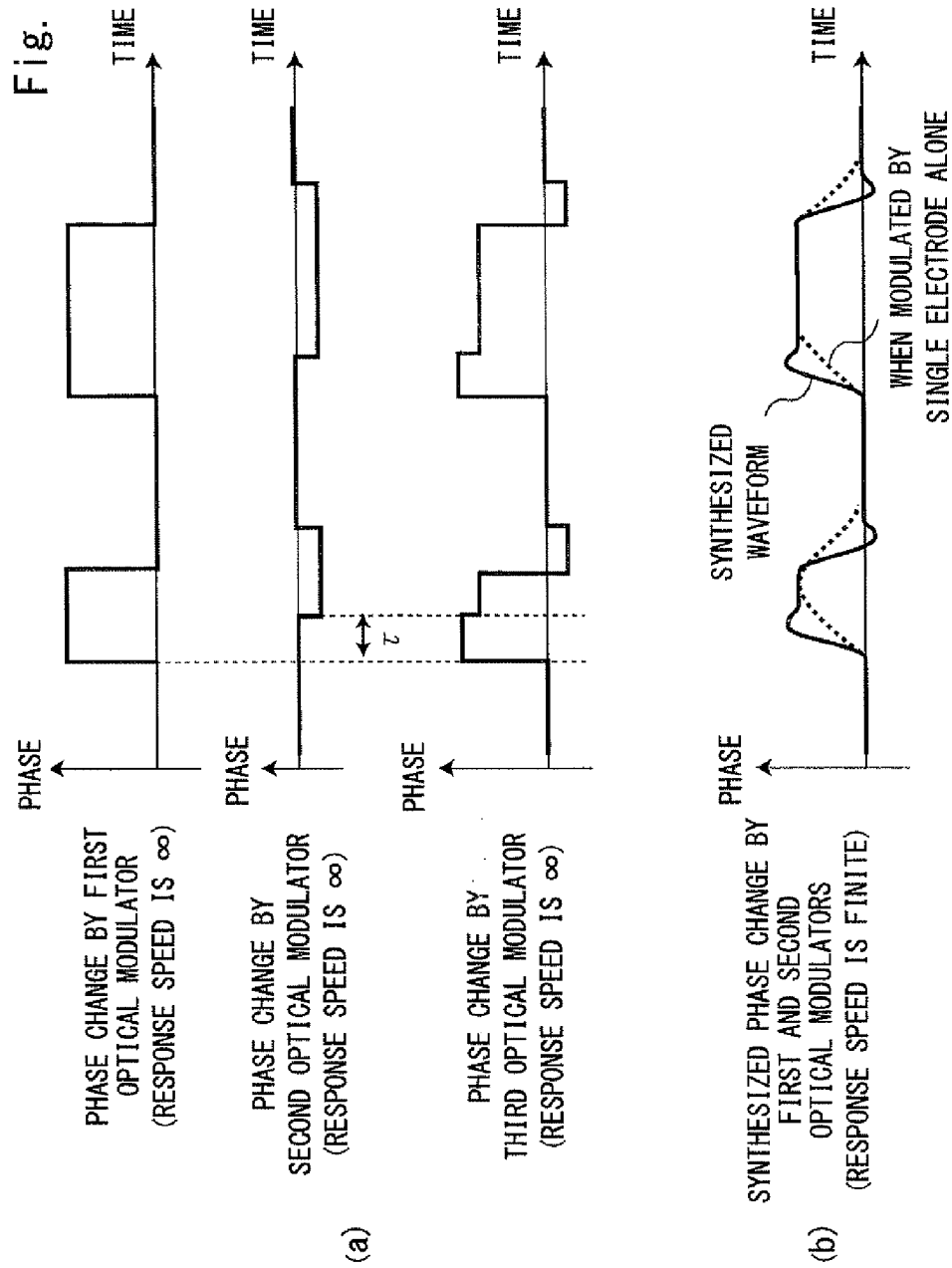
FIG. 14B is a configuration diagram of an optical modulator according to related art and a diagram for explaining its operation.

Next, an optical transmission/reception system according to a sixth exemplary embodiment of the present invention is explained with reference to FIG. 13. The optical transmission/reception system 200 shown in FIG. 13 uses an optical modulator(s) according to any of the above-described first to fifth exemplary embodiments. The optical transmission/reception system 200 includes an optical phase modulator 201, an optical receiver 202, and optical transmission path 203, and an optical amplifier 204. An optical modulator according to any of the above-described first to fifth exemplary embodiments may be used for the optical phase modulator 201. Further, the optical phase modulator 201 outputs, for example, a four-phase deviation modulated QPSK optical signal.

The optical phase modulator 201 is optically connected with the optical receiver 202 through the optical transmission path 203, and a QPSK optical signal propagates therebetween. The optical amplifier 204 is inserted on the optical transmission path 203 and amplifies the QPSK optical signal propagating through the optical transmission path 203. The optical receiver 202 demodulates the QPSK optical signal into an electric signal. In this manner, the optical transmission/reception system 200 can transmit an optical signal.

Other Exemplary Embodiments

It should be noted that the present invention is not limited to the above-described exemplary embodiments and they are modified as desired without departing from the spirit and scope of the present invention. For example, although the first and second waveform shaping signal generation devices are formed by using a polarity reverse device and/or an edge detection device in the above exemplary embodiments, they are not limited to such configurations. For example, those devices may have any configuration, provided that they are signal generation devices that create a difference between an expected waveform response and an actual waveform response.

Further, in the above-described exemplary embodiments, cases where an actual waveform response, which is originally delayed from and blunter than an expected waveform response, is advanced and made steeper by the present invention are explained. However, it is possible to intentionally delay a waveform response and make the waveform blunter, which is originally too advanced, by modifying the process performed in the waveform shaping signal generation device. For example, in the first exemplary embodiment, when the first and second waveform shaping signal generation devices are driven without performing the polarity reverse process therein, the waveform can be shaped so that the rising/falling edges of the waveform are made blunter.

As described above, according to the present invention, every possible waveform shaping process can be performed by appropriately adjusting the waveform shaping signal devices and the electric delay devices, the drive device amplitudes, and so on according to the expected waveform response. By applying this function, it is possible, for example, to generate an RZ (Return to Zero) signal by using an NRZ drive device having a narrow band or narrow the spectrum of an optical signal by removing unnecessary high-frequency components. Further, it is also possible to realize an optical communication system having higher frequency use efficiency.

The whole or part of the exemplary embodiments disclosed above can be described as, but not limited to, the following supplementary notes.

(Supplementary Note 1)

An optical transmission system comprising:

a first optical modulator that performs an optical modulation process for input light;

a second optical modulator that performs an optical modulation process for the input light;

a third optical modulator that performs an optical modulation process for the input light;

signal output means for outputting a drive signal according to an input signal to the first optical modulator;

first waveform shaping signal output means for outputting a first waveform shaping signal to the second optical modulator; and second waveform shaping signal output means for outputting a second waveform shaping signal to the third optical modulator, wherein the first waveform shaping signal output means outputs the first waveform shaping signal at a timing relatively later than a timing of an output of a signal by the first optical modulator, and the second waveform shaping signal output means outputs the second waveform shaping signal at a timing relatively earlier than the timing of the output of the signal by the first optical modulator.

(Supplementary Note 2)

The optical transmission system described in Supplementary note 1, wherein the first waveform shaping signal shapes a part of a signal immediately after rising and falling edges thereof, the signal being output by the first optical modulator, and the second waveform shaping signal shapes a part of the signal immediately before the rising and falling edges thereof, the signal being output by the first optical modulator.

(Supplementary Note 3)

The optical transmission system described in Supplementary note 2, wherein the first waveform shaping signal shapes the part of the signal output by the first optical modulator immediately after the rising and falling edges thereof so that that part becomes steeper, and the second waveform shaping signal shapes the part of the signal output by the first optical modulator immediately before the rising and falling edges thereof so that that part becomes steeper.

(Supplementary Note 4)

The optical transmission system described in Supplementary note 3, wherein the first and second waveform shaping signal output means receive the input signal and reverse its polarity, and then convert the polarity-reversed signal into an signal having an amplitude smaller than that of the input electric signal and output the converted signal as first and second waveform shaping signals.

(Supplementary Note 5)

The optical transmission system described in Supplementary note 3, wherein the second waveform shaping signal output means generates a pulse signal whose polarity is reversed earlier than rising and falling timings of the input signal by a certain time, and the first waveform shaping signal output means generates a pulse signal whose polarity is reversed later than the rising and falling timings of the input signal by a certain time.

(Supplementary Note 6)

The optical transmission system described in any one of Supplementary notes 1 to 3, wherein the input signal is an N-bit digital signal capable of expressing a multi-value level, the optical transmission system further comprises:

a first DAC that receives the input signal and converts the input signal into a multi-value signal; and second and third DACs each of which converts a polarity-reversed digital signal into a multi-value signal, and the first DAC is connected to the signal output means, and the second and third DACs are connected to the first and second waveform shaping signal output means, respectively.

(Supplementary Note 7)

An optical phase modulator comprising:

a first optical modulator that performs an optical modulation process for input light;

a second optical modulator that performs an optical modulation process for the input light;

a third optical modulator that performs an optical modulation process for the input light;

signal output means for outputting a drive signal according to an input signal to the first optical modulator;

first waveform shaping signal output means for outputting a first waveform shaping signal to the second optical modulator; and second waveform shaping signal output means for outputting a second waveform shaping signal to the third optical modulator, wherein the first waveform shaping signal output means outputs the first waveform shaping signal at a timing relatively later than a timing of an output of a signal by the first optical modulator, and the second waveform shaping signal output means outputs the second waveform shaping signal at a timing relatively earlier than the timing of the output of the signal by the first optical modulator.

(Supplementary Note 8)

The optical phase modulator described in Supplementary note 7, wherein the first waveform shaping signal shapes a part of a signal immediately after rising and falling edges thereof, the signal being output by the first optical modulator, and the second waveform shaping signal shapes a part of the signal immediately before the rising and falling edges thereof, the signal being output by the first optical modulator.

(Supplementary Note 9)

The optical phase modulator described in Supplementary note 8, wherein the first waveform shaping signal shapes the part of the signal output by the first optical modulator immediately after the rising and falling edges thereof so that that part becomes steeper, and the second waveform shaping signal shapes the part of the signal output by the first optical modulator immediately before the rising and falling edges thereof so that that part becomes steeper.

(Supplementary Note 10)

The optical phase modulator described in Supplementary note 9, wherein the first and second waveform shaping signal output means receive the input signal and reverse its polarity, and then convert the polarity-reversed signal into an signal having an amplitude smaller than that of the input signal and output the converted signal as first and second waveform shaping signals.

(Supplementary Note 11)

The optical phase modulator described in Supplementary note 9, wherein the second waveform shaping signal output means generates a pulse signal whose polarity is reversed earlier than rising and falling timings of the input signal by a certain time, and the first waveform shaping signal output means generates a pulse signal whose polarity is reversed later than the rising and falling timings of the input signal by a certain time.

(Supplementary Note 12)

The optical phase modulator described in any one of Supplementary notes 7 to 9, wherein the input signal is an N-bit digital signal capable of expressing a multi-value level, the optical phase modulator further comprises:

a first DAC that receives the input signal and converts the input signal into a multi-value signal; and second and third DACs each of which converts a polarity-reversed digital signal into a multi-value signal, and the first DAC is connected to the signal output means, and the second and third DACs are connected to the first and second waveform shaping signal output means, respectively.

(Supplementary Note 13)

A Mach-Zehnder optical phase modulator obtained by combining two optical phase modulators according to any one of Supplementary notes 7 to 12.

(Supplementary Note 13)

An optical modulation method for modulating input light based on a drive signal, a first waveform shaping signal, and a second waveform shaping signal, the drive signal being adapted to change according to an input signal, the optical modulation method comprising:

performing an optical modulation for the input light by using the drive signal;

performing waveform shaping for the input light by using the second waveform shaping signal at a timing relatively earlier than a timing of the drive signal; and performing waveform shaping for the input light by using the first waveform shaping signal at a timing relatively later than the timing of the drive signal.

(Supplementary Note 14)

The optical modulation method described in Supplementary note 7, wherein the first waveform shaping signal shapes a part of a signal immediately after rising and falling edges thereof, the signal being output by the first optical modulator, and the second waveform shaping signal shapes a part of the signal immediately before the rising and falling edges thereof, the signal being output by the first optical modulator.

(Supplementary Note 15)

The optical modulation method described in Supplementary note 8, wherein the first waveform shaping signal shapes the part of the signal output by the first optical modulator immediately after the rising and falling edges thereof so that that part becomes steeper, and the second waveform shaping signal shapes the part of the signal output by the first optical modulator immediately before the rising and falling edges thereof so that that part becomes steeper.

(Supplementary Note 16)

The optical modulation method described in Supplementary note 9, wherein the first and second waveform shaping signal output means receive the input signal and reverse its polarity, and then convert the polarity-reversed signal into an signal having an amplitude smaller than that of the input signal and output the converted signal as first and second waveform shaping signals.

(Supplementary Note 17)

The optical modulation method described in Supplementary note 9, wherein the second waveform shaping signal output means generates a pulse signal whose polarity is reversed earlier than rising and falling timings of the input signal by a certain time, and the first waveform shaping signal output means generates a pulse signal whose polarity is reversed later than the rising and falling timings of the input signal by a certain time.

(Supplementary Note 18)

An optical transmission/reception system using an optical transmission system or an optical phase modulator according to any one of Supplementary notes 1 to 12.

Although the present invention is explained above with reference to exemplary embodiments, the present invention is not limited to the above-described exemplary embodiments. Various modifications that can be understood by those skilled in the art can be made to the configuration and details of the present invention within the scope of the invention.

This application is based upon and claims the benefit of priority from Japanese patent applications No. 2012-224214, filed on Oct. 9, 2012, the disclosure of which is incorporated herein in its entirety by reference.

REFERENCE SIGNS LIST

10 OPTICAL PHASE MODULATOR
10A SECOND OPTICAL MODULATOR
10a OPTICAL WAVEGUIDE
10b OPTICAL WAVEGUIDE
11a FIRST OPTICAL MODULATOR
11b FIRST DRIVE DEVICE
11c FIRST ELECTRIC DELAY DEVICE
11e FIRST DAC
11e1 FIRST DAC
11S SIGNAL OUTPUT MEANS
12a SECOND OPTICAL MODULATOR
12b SECOND DRIVE DEVICE
12c SECOND ELECTRIC DELAY DEVICE
12d FIRST WAVEFORM SHAPING SIGNAL GENERATION DEVICE
12d1 FIRST WAVEFORM SHAPING SIGNAL GENERATION DEVICE
12e SECOND DAC
12S FIRST WAVEFORM SHAPING SIGNAL OUTPUT MEANS
13a THIRD OPTICAL MODULATOR
13b THIRD DRIVE DEVICE
13c THIRD ELECTRIC DELAY DEVICE
13d SECOND WAVEFORM SHAPING SIGNAL generation device
13d1 SECOND WAVEFORM SHAPING SIGNAL generation device
13e THIRD DAC
13S SECOND WAVEFORM SHAPING SIGNAL output means
20 ANALOG DIFFERENTIAL DEVICE
30 DIGITAL DEVICE
40 OPTICAL DEMULTIPLEXER
41 OPTICAL DEMULTIPLEXER
42 UNREVERSED PHASE SIDE LIGHT TO BE modulated
43 REVERSED PHASE SIDE LIGHT TO BE Modulated
101 FIRST OPTICAL MODULATOR
102 SECOND OPTICAL MODULATOR
103 OPTICAL WAVEGUIDE
200 OPTICAL TRANSMISSION/RECEPTION SYSTEM
201 OPTICAL PHASE MODULATOR
202 OPTICAL RECEIVER
203 OPTICAL TRANSMISSION PATH
204 OPTICAL AMPLIFIER

What is claimed is:

1. An optical transmission system comprising:
a first optical modulator that performs an optical modulation process for input light;
a second optical modulator that performs an optical modulation process for the input light;
a third optical modulator that performs an optical modulation process for the input light;
signal output unit that outputs a drive signal according to an input signal to the first optical modulator;
first waveform shaping signal output unit that outputs a first waveform shaping signal to the second optical modulator; and
second waveform shaping signal unit that outputs a second waveform shaping signal to the third optical modulator, wherein
the first waveform shaping signal output unit outputs the first waveform shaping signal at a timing relatively later than a timing of an output of a signal by the first optical modulator, and
the second waveform shaping signal output unit outputs the second waveform shaping signal at a timing relatively earlier than the timing of the output of the signal by the first optical modulator.

2. The optical transmission system according to claim 1, wherein
the first waveform shaping signal shapes a part of a signal immediately after rising and falling edges thereof, the signal being output by the first optical modulator, and
the second waveform shaping signal shapes a part of the signal immediately before the rising and falling edges thereof, the signal being output by the first optical modulator.

3. The optical transmission system according to claim 2, wherein
the first waveform shaping signal shapes the part of the signal output by the first optical modulator immediately after the rising and falling edges thereof so that that part becomes steeper, and
the second waveform shaping signal shapes the part of the signal output by the first optical modulator immediately before the rising and falling edges thereof so that that part becomes steeper.

4. The optical transmission system according to claim 3, wherein the first and second waveform shaping signal output units receive the input signal and reverse its polarity, and then convert the polarity-reversed signal into an signal having an amplitude smaller than that of the input signal and output the converted signal as first and second waveform shaping signals.

5. The optical transmission system according to claim 3, wherein
the second waveform shaping signal output unit generates a pulse signal whose polarity is reversed earlier than rising and falling timings of the input signal by a certain time, and
the first waveform shaping signal output unit generates a pulse signal whose polarity is reversed later than the rising and falling timings of the input signal by a certain time.

6. The optical transmission system according to claim 3, wherein
the input signal is an N-bit digital signal capable of expressing a multi-value level,
the optical transmission system further comprises:
a first DAC that receives the input signal and converts the input signal into a multi-value signal; and
second and third DACs each of which converts a polarity-reversed digital signal into a multi-value signal, and
the first DAC is connected to the signal output unit, and the second and third DACs are connected to the first and second waveform shaping signal output units, respectively.

7. An optical phase modulator comprising:
a first optical modulator that performs an optical modulation process for input light;
a second optical modulator that performs an optical modulation process for the input light;
a third optical modulator that performs an optical modulation process for the input light;
signal output unit that outputs a drive signal according to an input signal to the first optical modulator;
first waveform shaping signal output unit that outputs a first waveform shaping signal to the second optical modulator; and
second waveform shaping signal output unit that outputs a second waveform shaping signal to the third optical modulator, wherein
the first waveform shaping signal output unit outputs the first waveform shaping signal at a timing relatively later than a timing of an output of a signal by the first optical modulator, and
the second waveform shaping signal output unit outputs the second waveform shaping signal at a timing relatively earlier than the timing of the output of the signal by the first optical modulator.

8. The optical phase modulator according to claim 7, wherein
the first waveform shaping signal shapes a part of a signal immediately after rising and falling edges thereof, the signal being output by the first optical modulator, and
the second waveform shaping signal shapes a part of the signal immediately before the rising and falling edges thereof, the signal being output by the first optical modulator.

9. A Mach-Zehnder optical phase modulator obtained by combining two optical phase modulators according to claim 8.

10. An optical modulation method for modulating input light based on a drive signal, a first waveform shaping signal, and a second waveform shaping signal, the drive signal being adapted to change according to an input signal, the optical modulation method comprising:
performing an optical modulation for the input light by using the drive signal;
performing waveform shaping for the input light by using the second waveform shaping signal at a timing relatively earlier than a timing of the drive signal; and
performing waveform shaping for the input light by using the first waveform shaping signal at a timing relatively later than the timing of the drive signal.

* * * * *